US012648049B2

(12) United States Patent     (10) Patent No.:   US 12,648,049 B2

Qu et al.     (45) Date of Patent:    Jun. 2, 2026

---

(54) DISCONTINUOUS RECEPTION METHOD, DEVICE AND READABLE STORAGE MEDIUM

(71) Applicant: VIVO MOBILE COMMUNICATION CO., LTD., Guangdong (CN)

(72) Inventors: Xin Qu, Guangdong (CN); Xueming Pan, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 290 days.

(21) Appl. No.: 18/587,315

(22) Filed: Feb. 26, 2024

(65) Prior Publication Data

US 2024/0196476 A1     Jun. 13, 2024

Related U.S. Application Data

(63) Continuation of application No. PCT/CN2022/114134, filed on Aug. 23, 2022.

(30) Foreign Application Priority Data

Aug. 30, 2021    (CN) .......................... 202111005687.4

(51) Int. Cl.
    H04W 76/28       (2018.01)
    H04W 52/02       (2009.01)

(52) U.S. Cl.
    CPC ....... H04W 76/28 (2018.02); H04W 52/0229 (2013.01)

(58) Field of Classification Search
None
See application file for complete search history.

(56) References Cited

U.S. PATENT DOCUMENTS

| | | | |
|---|---|---|---|
| 2021/0212002 A1 | 7/2021 | Jung et al. | |
| 2022/0109488 A1* | 4/2022 | Nam ..................... | H04W 76/19 |
| 2023/0077869 A1* | 3/2023 | Ly ....................... | H04W 74/006 |
| | | | 370/311 |
| 2025/0048435 A1* | 2/2025 | Yan ................... | H04W 52/0235 |

FOREIGN PATENT DOCUMENTS

| | | |
|---|---|---|
| CN | 107682921 A | 2/2018 |
| CN | 110754120 A | 2/2020 |
| CN | 111148191 A | 5/2020 |
| CN | 111316198 A | 6/2020 |

(Continued)

OTHER PUBLICATIONS

First Office Action for CN Patent Application No. 202111005687.4 of Jul. 22, 2025.

(Continued)

*Primary Examiner* — Robert M Morlan
(74) *Attorney, Agent, or Firm* — Perilla Knox & Hildebrandt LLP; Kenneth A. Knox

(57) ABSTRACT

A discontinuous reception method, a device, and a readable storage medium. The method includes: A terminal periodically receives a preamble sequence from a transmit end, and the terminal determines, based on a time position of the preamble sequence, a start position of a time window for receiving a wake-up signal in a next DRX circle.

20 Claims, 6 Drawing Sheets

(56)              References Cited

FOREIGN PATENT DOCUMENTS

| | | | |
|----|----------------|----|--------|
| CN | 111699753 | A | 9/2020 |
| EP | 3625997 | B1 | 8/2021 |
| WO | 2021089284 | A1 | 5/2021 |

OTHER PUBLICATIONS

3GPP TSG RAN WG1, "Power Saving Signal for efeMTC," R1-1804694, Intel Corporation, Sanya, China, Apr. 16-20, 2018, Meeting #92bis, Agenda item 6.2.6.3, for Discussion/Decision.
International Search Report for International Application No. PCT/CN2022/114134 of Sep. 29, 2022.
Extended European Search Report for EP Patent Application No. 22863222.0 of Dec. 10, 2024.

* cited by examiner

Network-side device

12

11                    11

Terminal

Terminal

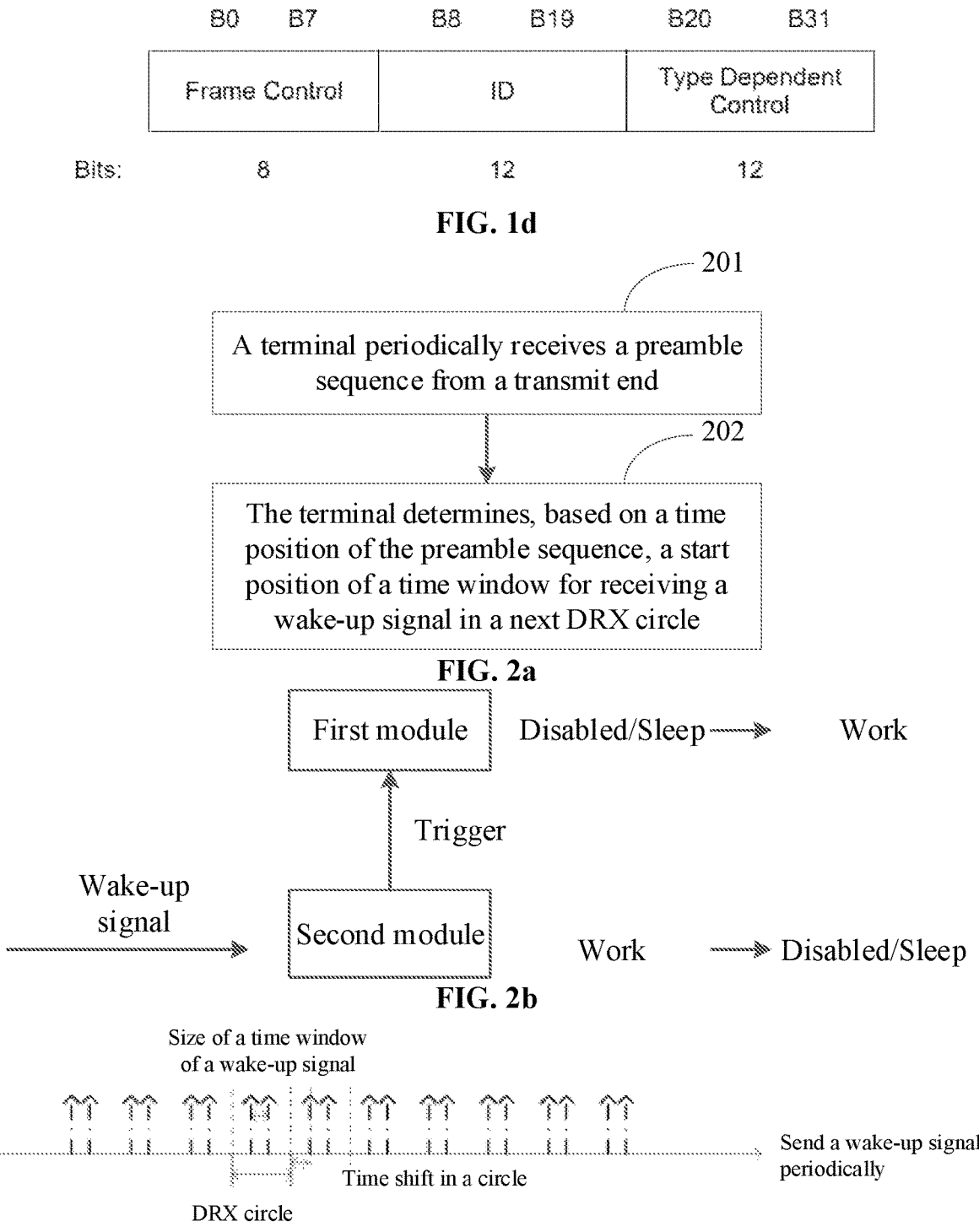

| B0    B7 | B8    B19 | B20    B31 |
|----------|-----------|------------|
| Frame Control | ID | Type Dependent Control |

Bits:          8                    12                    12

A terminal periodically receives a preamble sequence from a transmit end

202

The terminal determines, based on a time position of the preamble sequence, a start position of a time window for receiving a wake-up signal in a next DRX circle

FIG. 2a

First module    Disabld/Sleep ——➤    Work

Trigger

Wake-up signal ——➤    Second module    Work ——➤ Disabled/Sleep

FIG. 2b

Size of a time window of a wake-up signal

Time shift in a circle

DRX circle

Send a wake-up signal periodically

FIG. 2c

| Preamble I | Data payload |
|---|---|

| Preamble II |
|---|

FIG. 3b

| Delimiter | Preamble | Data payload |
|-----------|----------|--------------|

DISCONTINUOUS RECEPTION METHOD, DEVICE AND READABLE STORAGE MEDIUM

CROSS-REFERENCE TO RELATED APPLICATIONS

This application is a continuation of International Application No. PCT/CN2022/114134 filed on Aug. 23, 2022, which claims priority to Chinese Patent Application No. 202111005687.4 filed on Aug. 30, 2021, which are incorporated herein by reference in their entireties.

TECHNICAL FIELD

This application relates to the field of communications technologies, and in particular, to a discontinuous reception method, a device, and a readable storage medium.

BACKGROUND

In the conventional technology, a beacon is sent to carry timing synchronization function (TSF) information in transmit-side. A receiver updates local TSF time based on the received TSF information, so that TSF time in receive-side and TSF time in transmit-side are consistent. However, in a manner of sending the beacon carries the TSF information, a large amount of signaling overheads and a large receiver decoding power consumption are required, and timing information cannot be obtained when the receiver fails to decode beacon data.

SUMMARY

Embodiments of this application provide a discontinuous reception method, a device, and a readable storage medium.

According to a first aspect, a discontinuous reception method is provided, including:

A terminal periodically receives a preamble sequence from a transmit end; and the terminal determines, based on a time position of the preamble sequence, a start position of a time window for receiving a wake-up signal in a next DRX circle.

According to a second aspect, a discontinuous reception apparatus is provided, including:

a first receiving module, configured for a terminal to periodically receive a preamble sequence from a transmit end; and a determining module, configured for the terminal to determine, based on a time position of the preamble sequence, a start position of a time window for receiving a wake-up signal in a next DRX circle.

According to a third aspect, a terminal is provided, including a processor, a memory, and a program that is stored in the memory and that is capable of being run on the processor, where the program is executed by the processor to implement steps in the method according to the first aspect.

According to a fourth aspect, a non-transitory readable storage medium is provided, where a program or an instruction is stored on the non-transitory readable storage medium, and the program or the instruction is executed by a processor to implement the method according to the first aspect.

According to a fifth aspect, a computer program product is provided, where the program product is stored in a non-transient storage medium, and the computer program product is executed by at least one processor to implement steps in the method according to the first aspect.

According to a sixth aspect, a chip is provided, where the chip includes a processor and a communication interface, the communication interface is coupled to the processor, and the processor is configured to run a program or an instruction to implement the method according to the first aspect.

According to a seventh aspect, an electronic device is provided, where the electronic device is configured to perform steps in the method according to the first aspect.

BRIEF DESCRIPTION OF DRAWINGS

FIG. 1d is a schematic structural diagram of an existing WUR beacon signal;

FIG. 2a is a schematic flowchart of a discontinuous reception method according to an embodiment of this application;

FIG. 2b is a schematic structural diagram of a terminal according to an embodiment of this application;

FIG. 2c is a schematic diagram of a DRX circle of a wake-up signal according to an embodiment of this application;

FIG. 3a to FIG. 3d are schematic diagrams of an application scenario according to an embodiment of this application;

FIG. 4 is a schematic structural diagram of a discontinuous reception apparatus according to an embodiment of this application; and FIG. 5 is a schematic structural diagram of a terminal according to an embodiment of this application.

DETAILED DESCRIPTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by persons of ordinary skill in the art without creative efforts fall within the protection scope of this application.

The specification of this application and the terms "first" and "second" in the claims are used to distinguish between similar objects, and are not used to describe a specified order or order. It should be understood that a term used in this way may be interchangeable in an appropriate case, so that the embodiments of this application can be implemented in a sequence other than those shown or described herein, and objects in "first" and "second" are generally of one type, and a quantity of objects is not limited. For example, the first object may be one, or may be multiple. In addition, in the specification and claims, "and/or" represents at least one of the connected objects, and the character "/" generally represents a "or" relationship between the associated objects.

It should be noted that the technology described in this embodiment of this application is not limited to an LTE-Advanced (LTE-A) system of Long Term Evolution (LTE)/LTE, and may be further applied to another wireless communication system such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application are often used interchangeably. The described technology may be used in the foregoing system and radio technology, or may be used in another system and radio technology. However, a new radio (NR) system is described below for an illustration purpose, and the term NR is used in most of the descriptions, although these technologies can also be used in an application other than an NR system application, for example, a $6^{th}$ generation (6G) communication system.

Figure 1A:
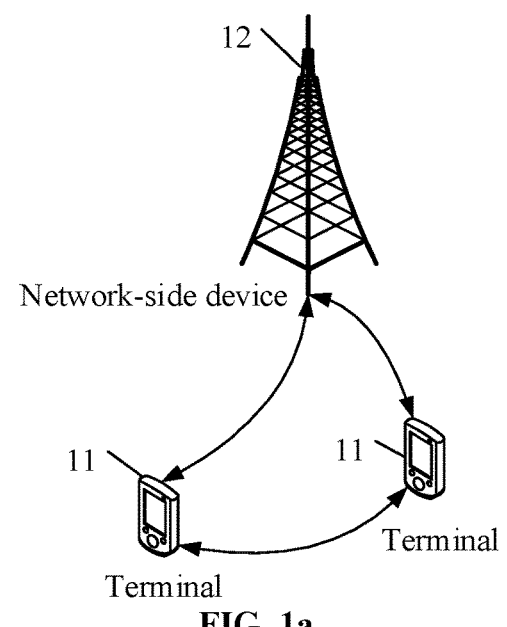
FIG. 1a is a schematic structural diagram of a wireless communication system according to an embodiment of this application.

FIG. 1a is a block diagram of a wireless communication system applicable to an embodiment of this application. The wireless communication system includes a terminal 11 and a network-side device 12. The terminal 11 may also be referred to as a terminal device or user equipment (UE). The terminal 11 may be a mobile phone, a tablet personal computer (TPC), a laptop computer (LC), or a notebook computer, a personal digital assistant (PDA), a handheld computer, a netbook, an ultra-mobile personal computer (UMPC), a mobile Internet device (MID), an augmented reality (AR)/virtual reality (VR) device, a robot, a wearable device (WD), vehicle user equipment (VUE), pedestrian user equipment (PUE), a smart home (a home device with a wireless communications function, such as a refrigerator, a television, a washing machine, or a furniture), or another terminal-side device. The wearable device may include: a smart watch, a smart band, a smart headset, smart glasses, a smart jewelry (a smart bangle, a smart bracelet, a smart ring, a smart necklace, a smart leglet, or a smart anklet), a smart wrist strap, a smart dress, a game machine, or the like. It should be noted that a specific type of the terminal 11 is not limited in this embodiment of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (Wi-Fi) node, a transmitting receiving point (TRP), or another appropriate term in the art. As long as same technical effect is achieved, the base station is not limited to a specified technical term. It should be noted that, in embodiments of this application, only a base station in an NR system is used as an example, but a specific type of the base station is not limited.

To better understand the solutions in the embodiments of this application, the following content is first described:

Low Power Wake-Up

Figure 1B:
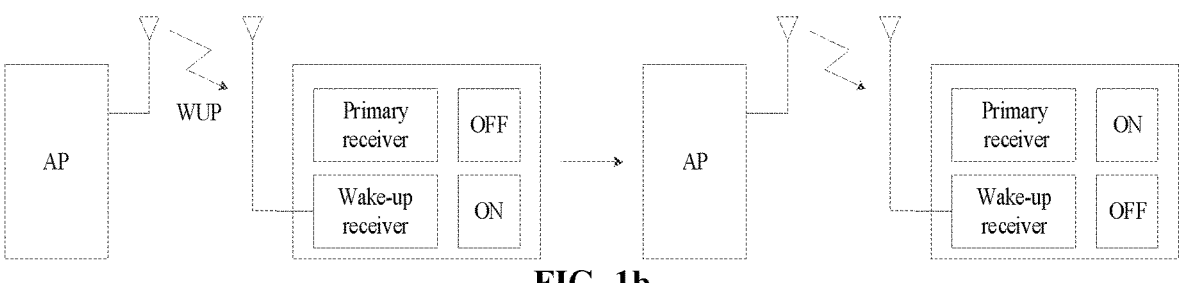
FIG. 1b is a schematic diagram of a working principle of an existing low power wake-up receiver.

In an existing wireless fidelity scenario, a low power wake-up receiver may be used. As shown in FIG. 1b, the low power wake-up receiver includes two parts: a primary receiver and a wake-up receiver. The primary receiver is used to send and receive wireless fidelity data. The wake-up receiver is used to wake up the primary receiver. Before being woken up, the primary receiver is in a disabled state, and does not send and receive data. The wake-up receiver receives a wake-up signal sent by a transmit end (for example, an access point (AP)), and the wake-up signal may be an on-off keying (OOK) modulation signal, so that the wake-up receiver may detect the wake-up signal in an envelope detection manner, and power consumption may be reduced to hundreds of microwatts, thereby greatly reducing power consumption of a user.

Wake-Up Signal Discontinuous Reception

Figure 1C:
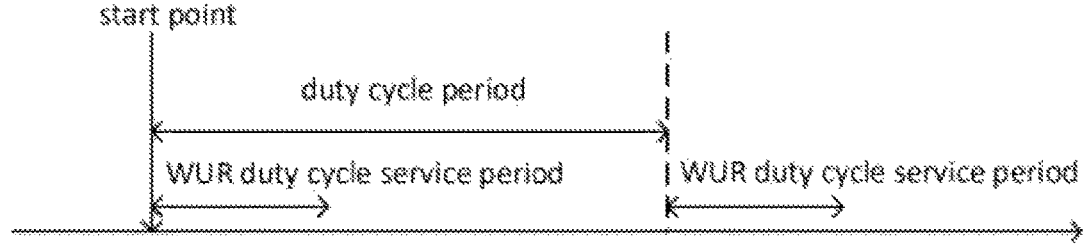
FIG. 1c is a schematic diagram of a working principle of existing discontinuous reception.

To further reduce power consumption of the wake-up receiver, a wake-up signal discontinuous reception manner is further used. The user and the AP determine a period, a start position, and a receive time length of wake-up signal discontinuous reception by using a wake-up radio (WUR) mode establishment process. As shown in FIG. 1c, a user receives a wake-up signal in a duty cycle service period in each duty cycle by using the wake-up receiver. The user notifies a length of a duty cycle period and a length of the duty cycle service period to the AP by sending a WUR mode element. The length of the duty cycle service period is less than or equal to the length of the duty cycle period, and the length of the duty cycle service period is greater than or equal to a minimum wake-up time length indicated by the AP. After the AP replies to confirm the length of the duty cycle period and the length of the duty cycle service period that are carried in the WUR mode element of the user, the user uses the length of the duty cycle period and the length of the duty cycle service period as parameters of a discontinuous circle of the user. In addition, a start position of the duty cycle service period, that is, a start point shown in FIG. 1c, is indicated by a mode element sent by the AP. 64 bits are used to indicate TSF time of the start position in a time unit of microseconds.

WUR Beacon Signal

To keep synchronization of the low power wake-up receiver and the AP, the WUR beacon signal is periodically sent to transfer time information. As shown in FIG. 1d, type-dependent control of a WUR beacon MAC frame carries 12 bits of information in [5:16] of 64 bits of a timing synchronization function (TSF) timer of the AP. After receiving the 12 bits of information, the user updates a local TSF timer of the user based on a time update rule, to achieve synchronization with the AP. A sending period and an offset of a sending start position of the WUR beacon are indicated by an operation element sent by the AP, the period is a minimum quantity of TSF time units between two times of beacon sending, and the start position is a quantity of TSF time units offset from TSF0. When a carrier sense multiple access (CSMA) deferral occurs, the WUR beacon is delayed to be sent in a current period, but is still sent in a subsequent cycle based on the sending cycle of the WUR beacon and a position determined based on the sending start position.

With reference to the accompanying drawings, the following describes in detail a method and an apparatus provided in embodiments of this application by using specific embodiments and application scenarios thereof.

Refer to FIG. 2a. An embodiment of this application provides a discontinuous reception method. The method may be executed by a terminal. The method specifically includes the following steps:

Step 201: The terminal periodically receives a preamble sequence from a transmit end.

Step 202: The terminal determines, based on a time position of the preamble sequence, a start position of a time window for receiving a wake-up signal in a next discontinuous reception (DRX) circle.

Specifically, the terminal in this embodiment of this application may be specifically a mobile terminal applied to an NR system. A specific structure of the terminal may be shown in FIG. 2b. The terminal includes two modules. A first module is a primary communication module, configured to receive and send mobile communication data, and a second module is a low power wake-up receiving module, configured to receive a wake-up signal. When the primary communication module does not receive and send data for a period of time, the primary communication module enters a disabled state or sleep state. When the second module detects a wake-up signal sent by a transmit end, and the wake-up signal includes information of the receive end, the second module triggers to wake up the first module, so that the first module enters a working state and may receive and send data. When the first module is not awakened by the second module, the first module is in the disabled or sleep state, and does not receive and send data.

Further, the second module may receive the wake-up signal in a manner of discontinuous reception. As shown in FIG. 2c, the second module wakes up for a period of time in each DRX circle, receives the wake-up signal in a wake-up signal time window, and enters a sleep state in another period of time, to further save power.

In this embodiment of this application, the preamble sequence is received periodically to periodically update reference time information for a low power wake-up receiver, so that the start position of a time window for receiving a wake-up signal in a discontinuous reception circle can be determined. This effectively resolves a time drift problem caused by poor clock precision. In addition, compared with a manner in which signaling is used to explicitly indicate time information, in a manner in which the sequence carries relative time information, signaling overheads and complexity of decoding to extract time information by the low power wake-up receiver can be reduced.

In a possible implementation, the method further includes:

the terminal receives a first configuration from the transmit end, where the first configuration includes one or more of the following:

(1) a period for receiving a wake-up signal;
(2) an offset of a start position for receiving a wake-up signal;
(3) an offset in a DRX circle for receiving a wake-up signal; and
(4) a size of a time window for receiving a wake-up signal.

In this embodiment of this application, for a given receive end (a terminal for execution in this embodiment of this application is a receive end) or a group of given receive ends, a position in a time domain and a position in a frequency domain that are for receiving the wake-up signal is configured, and the position in a time domain includes the foregoing one or more configurations.

The preamble sequence is a dedicated preamble sequence used for detection by one or one group of terminals, or the preamble sequence is a common preamble sequence used for detection by a plurality of or a plurality of groups of terminals.

In a possible implementation, that the terminal determines, based on a time position of the preamble sequence, a start position of a time window for receiving a wake-up signal in a next discontinuous reception DRX circle includes:

In a case that the preamble sequence is a dedicated preamble sequence, the terminal determines, based on a time position of the dedicated preamble sequence detected in a current DRX circle, the start position of a time window for receiving a wake-up signal in a next DRX circle.

In a possible implementation, in a case that the preamble sequence is a common preamble sequence, the first configuration further includes one or more of the following:

a period of receiving a common preamble sequence; and an offset of a start position for receiving a common preamble sequence.

That the terminal determines, based on a time position of the preamble sequence, a start position of a time window for receiving a wake-up signal in a next discontinuous reception DRX circle includes:

in a case that the preamble sequence is the common preamble sequence, the terminal determines, based on a latest time position of the dedicated preamble sequence detected the common preamble sequence, the start position of a time window for receiving a wake-up signal in a next DRX circle.

In a possible implementation, that the terminal determines, based on a time position of the preamble sequence, a start position of a time window for receiving a wake-up signal in a next discontinuous reception DRX circle further includes:

in a case that the terminal obtains, through detection, the dedicated preamble sequence is detected between two common preamble sequences, the terminal updates, based on a time position of the dedicated preamble sequence, the start position of a time window for receiving a wake-up signal in a next DRX circle.

The following describes the solutions of this application in detail based on a case that the preamble sequence is a common preamble sequence and a case that the preamble sequence is a dedicated preamble sequence.

Solution 1: When the preamble sequence is a dedicated preamble sequence. A method flow is as follows:

In this embodiment of this application, for a given receive end or a group of given receive ends, a position in a time domain and a position in a frequency domain that are for receiving a wake-up signal are configured, and the position in a time domain includes the following one or more configurations:

(1) a DRX circle: a period for receiving a wake-up signal;
(2) an offset of a start position for receiving a wake-up signal;
(3) an offset in a DRX circle for receiving a wake-up signal; and
(4) a size of a time window for receiving a wake-up signal.

The transmit end sends the dedicated preamble sequence at a fixed position in each DRX circle of the wake-up signal, and the fixed position in the period is determined based on the offset in a DRX circle for receiving a wake-up signal. The dedicated preamble sequence is dedicated to the receive end or the group of receive ends. A low power wake-up receiving module of the receive end determines, based on a time position obtained through detection of the dedicated preamble sequence in a current DRX circle, a start position of a time window for receiving a wake-up signal in a next DRX circle for a wake-up signal.

A specific method is as follows: The receive end determines, based on a dedicated preamble sequence obtained through detection in an (n−1)th DRX circle, a start position of the sequence, and marks the start position as $t'_{n-1}$. In this case, the receive end uses $t'_{n-1}$ as a new reference time position. Using $t'_{n-1}$ plus one $T_{DRX}$ time shift, and minus one delta obtains a start position of a time window for receiving a wake-up signal in an $n^{th}$ DRX circle, that is, $t'_{n-1}+T_{DRX}-$ delta, where $T_{DRX}$ is a length of a DRX circle, and delta is used to further reduce an error impact caused by clock shift of the low power wake-up receiver module. delta may be determined, by using a network configuration or by the receive end, based on an implementation, and a value of delta is greater than or equal to 0.

Figure 3A:
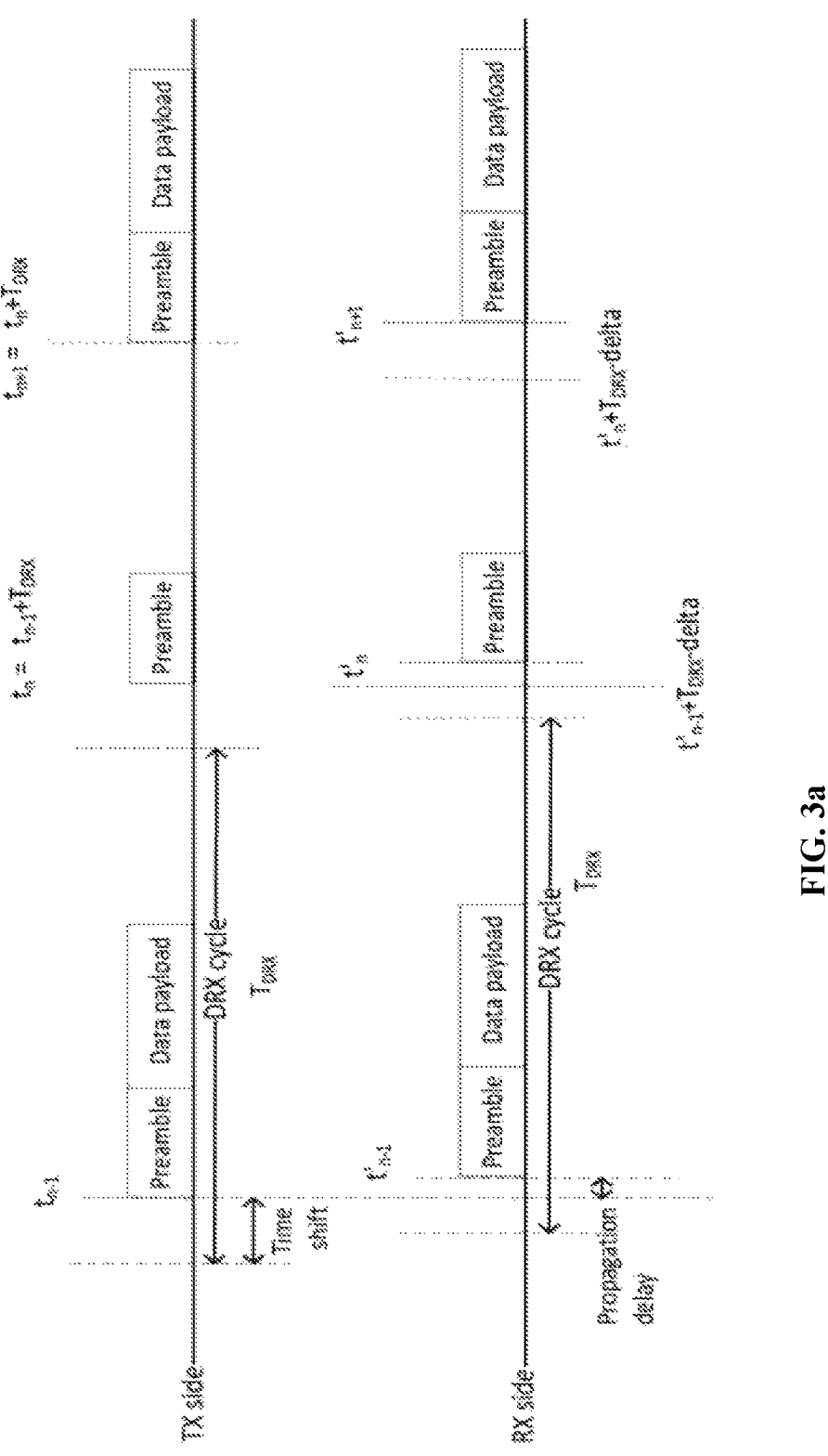

Similarly, the receive end determines a new reference time position after obtaining, through detection, the preamble sequence in each DRX circle, and based on this, the receive end determines the start position of a time window for receiving a wake-up signal in a next DRX circle, as shown in FIG. 3a.

If the receive end successfully obtains, through detection, a dedicated preamble sequence in the $(n-1)^{th}$ DRX circle, but fails to obtain, through detection, a dedicated preamble sequence in the $n^{th}$ DRX circle, the receive end does not update the reference time position, and still uses $t'_{n-1}$ as the reference time position. Using $t'_{n-1}$ plus two $T_{DRX}$ time shifts obtains a start position of a time window for receiving a wake-up signal at an $(n+1)^{th}$ DRX circle, that is, $t'_{n-1}+2*T_{DRX}-$delta.

Further, the transmit end selects a wake-up signal format based on whether the receive end needs to wake up in a DRX circle. In an $n^{th}$ DRX circle, and if there is no wake-up requirement, the transmit end sends only the dedicated preamble sequence, and a start position of the dedicated preamble sequence is marked as $t_n$; or if there is a wake-up requirement, the transmit end sends the dedicated preamble sequence and data payload. As shown in FIG. 3b, to indicate whether there is data payload after the dedicated preamble sequence, two different dedicated preamble sequences may be used for a same receive end (group), a sequence 1 indicates that there is subsequent data payload, and a sequence 2 indicates that there is no subsequent data payload. In addition, different dedicated preamble sequences may be used between different receive ends (groups) to identify a receive end (group). When a wake-up signal is corresponding to a receive end group and the group includes more than one receive end, data payload further includes an identifier of at least one receive end in the receive end group, to determine a receive end that is to be woken up.

For the foregoing solution 1, an embodiment that is specifically applied is provided.

In this embodiment, a transmit end is a base station, a receive end is a user, and the users are respectively users 1 to 8. Users 1 to 4 form a user group with an identifier user group 1, and users 5 to 8 form another user group with an identifier user group 2. In actual application, both the transmit end and the receive end may alternatively be users.

The base station uses primary communication module high-level signaling, such as RRC signaling, to configure for the user group 1, a period for receiving a wake-up signal; an offset of a start position for receiving a wake-up signal; an offset in a DRX circle for receiving a wake-up signal; and a size of a time window for receiving a wake-up signal, and configure for the user group 2, a period for receiving a wake-up signal; an offset of a start position for receiving a wake-up signal; an offset in a DRX circle for receiving a wake-up signal; and a size of a time window for receiving a wake-up signal, which are marked as $T1^{DRX}$, $t1^{start}$, $t1^{shift}$, and W1, and $T2^{DRX}$, $t2^{start}$, $t2^{shift}$, and W2. DRX configurations of the two user groups may be the same or different, and $t1^{start}$ and $t2^{start}$ are time shifts relative to a system frame SFN0.

It is assumed that users 1 and 2 in the user group 1 and users 5 and 8 in the user group 2 do not receive and send data in a period of time. Therefore, users 1 and 2 and users 5 and 8 each disable or make a primary communication module to sleep, and listen to a wake-up signal based on a DRX circle by using a low power wake-up receiving module. To be specific, the low power wake-up receiving module wakes up in each DRX circle to listen to a dedicated preamble sequence and subsequent data, and the low power wake-up receiving module is also in a sleep state at another time, to save power.

It is assumed that dedicated preamble sequences used by the user group 1 are sequences 1 and 2. The sequence 1 is used to indicate that there is no data payload after the sequence, and the low power wake-up receiving module may directly enter a sleep state after receiving the sequence. The sequence 2 is used to indicate that there is data payload after the sequence. After data is received and a user identifier for waking up is determined through decoding, a low power wake-up receiving module of a user whose user identifier is included in the data payload triggers a primary communication module to wake up to enter a working state, and a low power wake-up receiving module of another user enters a sleep state.

Similarly, dedicated preamble sequences used by the user group 2 are sequences 3 and 4. The sequence 3 is used to indicate that there is no data payload after the sequence, and the low power wake-up receiving module may directly enter a sleep state after receiving the sequence. The sequence 4 is used to indicate that there is data payload after the sequence. After data is received and a user identifier for waking up is determined through decoding, a low power wake-up receiving module of a user whose user identifier is not included in the data payload enters a sleep state, and another user triggers a primary communication module to wake up to enter the working state.

An association relationship between the user group and the dedicated preamble sequence may be explicitly configured by using high-layer signaling of the base station, or may be obtained through calculation by using a preset rule. For example, the users 1 to 4 obtain a label of the user group based on an identifier of each user, for example, a TMSI, through a modulo operation by group similar to paging a user. In this embodiment, it is assumed that a label obtained through calculation is 1, two preamble sequence pools exist in a system totally, a pool 1 and a pool 2, and the preset rule can be to select preamble sequences with the label 1 from the pool 1 and the pool 2 as the dedicated preamble sequence 1 and the dedicated preamble sequence 2 of the user group 1.

Refer to FIG. 3a. The base station sends the dedicated preamble sequence 1 or 2 in each DRX circle of the user group 1, and further sends data payload at the same time when sending the sequence 2. The users 1 and 2 in the user group 1 obtain $T1^{DRX}$, $t1^{start}$, $t1^{shift}$, and W1 from the high-layer signaling of the base station through the primary communication module, and the users 1 and 2 establish downlink synchronization with the base station through the primary communication module. Therefore, a start position for enabling listening to a wake-up signal can be determined as $t1^{start}+X*T1^{DRX}+t1^{shift}$, where a value of X enables the time position for enabling listening to a wake-up signal to be not later than time when the primary module enters a disabled state and a sleep state. Therefore, from a time point $t1^{start}+X*T1^{DRX}+t1^{shift}$, each of the users 1 and 2 wakes up and listens to the wake-up signal at every period, and the base station sends the dedicated preamble sequence 2 and the data payload in an $(n-1)^{th}$ DRX circle, and the data payload includes an identifier of the user 2. The users 1 and 2 obtain the preamble sequence 2 through detection in the $(n-1)^{th}$ DRX circle, and determine a start position of the sequence and mark the start position of the sequence as $t'_{n-1}$. Therefore, the users 1 and 2 use $t'_{n-1}$ as a new reference time position. Using $t'_{n-1}$ plus one $T_{DRX}$ time shift, and minus one delta obtains a start position of a time window for receiving a wake-up signal in an $n^{th}$ DRX circle, that is, $t'_{n-1}+T_{DRX}-$ delta. The users 1 and 2 obtain the sequence 2 through decoding, and the user 2 determines that the identifier of the user 2 is included in the data payload. Therefore, the user 2 triggers the primary communication module to wake up to enter a working state. The low power wake-up receiving module of the user 1 re-enters the sleep state.

Similarly, the users 5 and 8 of the user group 2 determine, by listening to the dedicated sequences 3 and 4, a start position of a time window for receiving a wake-up signal in a next DRX circle for a wake-up signal, and determine, based on a user identifier included in data payload, whether to wake up the primary communication module.

In the foregoing embodiment, an OOK modulation manner may be used for the preamble sequence and the data payload. Therefore, to facilitate time accumulation at a receive end, a value of an integer multiple of a length of an OOK symbol may be used for a period $T_{DRX}$.

Solution 2: The preamble sequence is a common preamble sequence. A method flow is as follows:

The transmit end periodically sends the common preamble sequence, and a plurality of receive ends or a plurality of groups of receive ends periodically detect the common preamble sequence.

For a given receive end or a given receive end group, a position in a time domain and a position in a frequency domain that are for receiving a wake-up signal is configured, and the position in a time domain includes the following one or more configurations:

(1) a DRX circle: a period for receiving a wake-up signal, marked as $T_{DRX}$;

(2) an offset of a start position for receiving a wake-up signal, marked as $T_{offset}$;

(3) an offset in a DRX circle for receiving a wake-up signal, marked as $T_{shift}$; and (4) a size of a time window for receiving a wake-up signal.

For a plurality of receive ends or a plurality of groups of receive ends, a position in a time domain and a position in a frequency domain for receiving the common preamble sequence is configured, and the position in a time domain includes one or more of the following configurations:

(1) period: a period of receiving a common preamble sequence; and (2) an offset of a start position for receiving a common preamble sequence.

The low power wake-up receiver determines, based on a latest time position of the dedicated preamble sequence detected the common preamble sequence, a start position of a time window for receiving a wake-up signal in a next DRX circle for a wake-up signal. Between two common preamble sequences, if a given receive end or receive end group obtains through detection a dedicated preamble sequence of the given receive end or receive end group, the given receive end or receive end group updates a start position of a next wake-up signal DRX circle based on a time position of the dedicated preamble sequence.

Figure 3C:
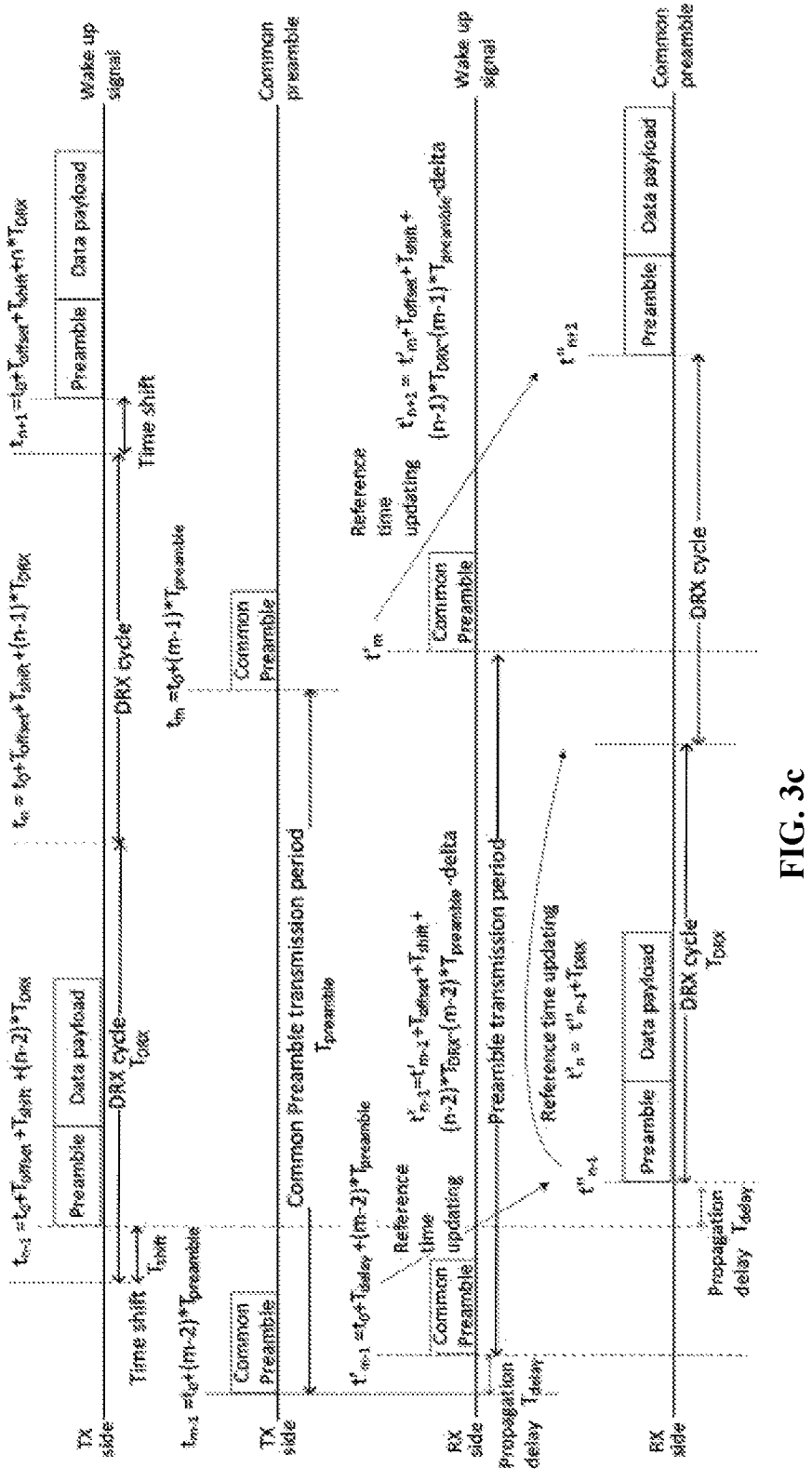

A specific method is as follows: As shown in FIG. 3c, the transmit end periodically sends the common preamble sequence, and a sending period is $T_{preamble}$, and a start position is t0. A plurality of receive ends or a plurality of groups of receive ends detect the common preamble sequence based on $T_{preamble}$ periodically. For a given receive end or receive group, the transmit end sends a wake-up signal when there is a wake-up requirement, and a sending period is $T_{DRX}$, and a start position is $t_0+T_{offset}$, where $T_{offset}$ is a time shift relative to the start position $t_0$ of the common preamble sequence. A low power wake-up receiver at the receive end wakes up and listens to the common preamble sequence and the wake-up signal based on $T_{preamble}$ and $T_{DRX}$ periodically, and enters a sleep state at another period of time.

The receive end determines, based on a common preamble sequence obtained through detection in an $(m-1)^{th}$ period, a start position of the sequence, and marks the start position as $t'_{m-1}$. The receive end uses $t'_{m-1}$ as a new reference time position. Using $t'_{m-1}$ plus one time difference $T_{gap}$ obtains a start position of a time window for listening to a wake-up signal at an $(n-1)^{th}$ DRX circle for a wake-up signal, that is, $t'_{n-1}=t'_{m-1}+T_{gap}$, where the time difference is $T_{gap}=T_{offset}+T_{shift}+(n-2)*T_{DRX}-(m-2)*T_{preamble}$–delta.

Further, between two common preamble sequences, if the receive end obtains through detection a dedicated preamble sequence of the receive end, the receive end updates a start position of a next wake-up signal DRX circle based on a time position of the dedicated preamble sequence. Therefore, the receive end determines, based on a dedicated preamble sequence obtained through detection in an $(n-1)^{th}$ DRX circle, that a start position of the sequence is $t'_{n-1}$, and uses the start position as a new reference time position. Using $t'_{n-1}$ plus one $T_{DRX}$ time shift, and minus one delta obtains a start position of a time window for listening to a wake-up signal in an $n^{th}$ DRX circle for a wake-up signal, that is, $t'_{n-1}+T_{DRX}$–delta.

Further, the transmit end sends the wake-up signal only when there is a wake-up user requirement in one DRX circle, or does not send any signal when there is no wake-up user requirement in one DRX circle.

In solution 2, an alternative method is as follows: The transmit end does not periodically send a common preamble sequence, the transmit end sends a common preamble sequence in a DRX circle in which the receive end does not send a wake-up signal, and the receive end only wakes up based on a DRX circle to receive a wake-up signal and perform sequence detection. The receive end does not detect the common preamble sequence based on $T_{preamble}$.

A specific method is as follows: The receive end determines, based on a dedicated preamble sequence or a common preamble sequence obtained through detection in an $(n-1)^{th}$ DRX circle, a start position of the sequence, and marks the start position as $t'_{n-1}$. In this case, the receive end uses $t'_{n-1}$ as a new reference time position. Using $t'_{n-1}$ plus one $T_{DRX}$ time shift, and minus one delta obtains a start position of a time window for receiving a wake-up signal in an $n^{th}$ DRX circle, that is, $t'_{n-1}+T_{DRX}$–delta, where $T_{DRX}$ is a length of a DRX circle, and delta is used to further reduce an error impact caused by clock shift of the low power wake-up receiver module. delta may be determined, by using a network configuration or by the receive end, based on an implementation, and a value of delta is greater than or equal to 0.

For the foregoing solution 2, an embodiment that is specifically applied is provided.

In this embodiment, a transmit end is a base station, a receive end is a user, and the users are respectively users 1 to 8. Users 1 to 4 form a user group with an identifier user group 1, and users 5 to 8 form another user group with an identifier user group 2. In actual application, both the transmit end and the receive end may alternatively be users.

The base station uses primary communication module high-level signaling, such as SIB signaling, to configure a start position to and a period $T_{preamble}$ that are for sending the common preamble sequence. The base station uses primary communication module high-level signaling, such as RRC signaling, to configure for the user group 1, a period for sending a wake-up signal; an offset of a start position for receiving a wake-up signal; an offset in a DRX circle for receiving a wake-up signal; and a size of a time window for receiving a wake-up signal, and configure for the user group 2, a period for sending a wake-up signal; an offset of a start position for receiving a wake-up signal; an offset in a DRX circle for receiving a wake-up signal; and a size of a time window for receiving a wake-up signal, which are respectively marked as $T1^{DRX}$, $T1^{offset}$, $T1^{shift}$, and W1, and $T2^{DRX}$, $T2^{offset}$, $T2^{shift}$, and W2. DRX configurations of the two user groups may be the same or different, and $T1^{offset}$ and $T2^{offset}$ are time shifts relative to $t_0$.

It is assumed that the users 1 and 2 in the user group 1 do not receive and send data in a period of time. Therefore, the two users each disable or make a primary communication module to enter a sleep state, and listen to a wake-up signal based on a $T1^{DRX}$ circle by using a low power wake-up receiving module, that is, wake up and listen to whether to wake up the primary module in each DRX circle. To more accurately determine time of a start position of each DRX circle, the user wakes up at each common preamble sequence period to listen to a common preamble sequence, and the low power wake-up receiving modules of the users 1 and 2 are in a sleep state in a time period other than a time period of listening to a common preamble sequence and a time period of listening to a wake-up signal, to save power.

It is assumed that the dedicated preamble sequence used by the user group 1 is the sequence 1. When the users 1 and 2 obtain through detection the sequence 1, and after the users 1 and 2 receive the data and decode the sequence 1, and determine a user identifier for waking up, a low power wake-up receiving module of a user whose user identifier is included in the data payload triggers a primary module to wake up to enter a working state, and a low power wake-up receiving module of another user enters a sleep state.

An association relationship between the user group and the dedicated preamble sequence may be explicitly configured by using high-layer signaling of the base station, or may be obtained through calculation by using a preset rule. For example, the users 1 to 4 obtain a label of the user group based on an identifier of each user, for example, a temporary mobile subscription identifier (TMSI), through a modulo operation by group similar to paging a user. In this embodiment, it is assumed that the calculated label is 1, and a dedicated preamble sequence pool exists in the system totally, and the preset rule may be to select a preamble sequence with the label 1 from the dedicated preamble sequence pool as the dedicated preamble sequence of the user group 1.

Refer to FIG. 3c. The base station sends the common preamble sequence based on a start position to and a period $T_{preamble}$, and when the users 1 and 2 need to be woken up, the base station sends a wake-up signal in a latest wake-up signal DRX circle of the user group 1 based on $T1^{DRX}$, $T1^{offset}$, and $T1^{shift}$ The users 1 and 2 have established downlink synchronization with the base station before the primary module is disabled or enters the sleep state. Therefore, it may be determined that time for starting to listen to a common preamble sequence is $t_0+X*T_{preamble}$, and it may also be determined that time for starting to listening to the wake-up signal is $t_0+T1^{offset}+T1^{shift}+X'*T1^{DRX}$, where values of X, and X' enable a time position for listening to a common preamble sequence and a time position for listening to a wake-up signal to be not later than time when the primary module enters a disabled state and a sleep state.

Therefore, from a time point $t_0+X*T_{preamble}$, the users 1 and 2 wake up at each period to listen to the common preamble sequence, and from a time point $t_0+T1^{offset}+T1^{shift}+X'*T1^{DRX}$, the users 1 and 2 wake up at each period to listen to the wake-up signal.

The users 1 and 2 determine, based on a common preamble sequence obtained through detection at an $(m-1)^{th}$ period, a start position of the sequence, and mark the start position as $t'_{m-1}$. The receive end uses $t'_{m-1}$ as a new reference time position. Using $t'_{m-1}$ plus a time difference $T_{gap}$ obtains a start position of a time window for listening to a wake-up signal at an $(n-1)^{th}$ DRX circle for a wake-up signal, that is, $t'_{n-1}=t'_{m-1}+T_{gap}$, where the time difference is $T_{gap}=T_{offset}+T_{shift}+(n-2)*T_{DRX}-(m-2)*T_{preamble}-$delta.
The users 1 and 2 wake up at $t'_{n-1}$ to listen to the wake-up signal, determine a symbol position of data payload based on a dedicated preamble sequence obtained through detection, and decode data to obtain an identifier of the user 1 that is included in the data payload, and therefore the user 1 triggers the primary communication module to wake up to enter a working state, and the low power wake-up receiving module of the user 2 re-enters to a sleep state.

Figures 3D, 4, 5:
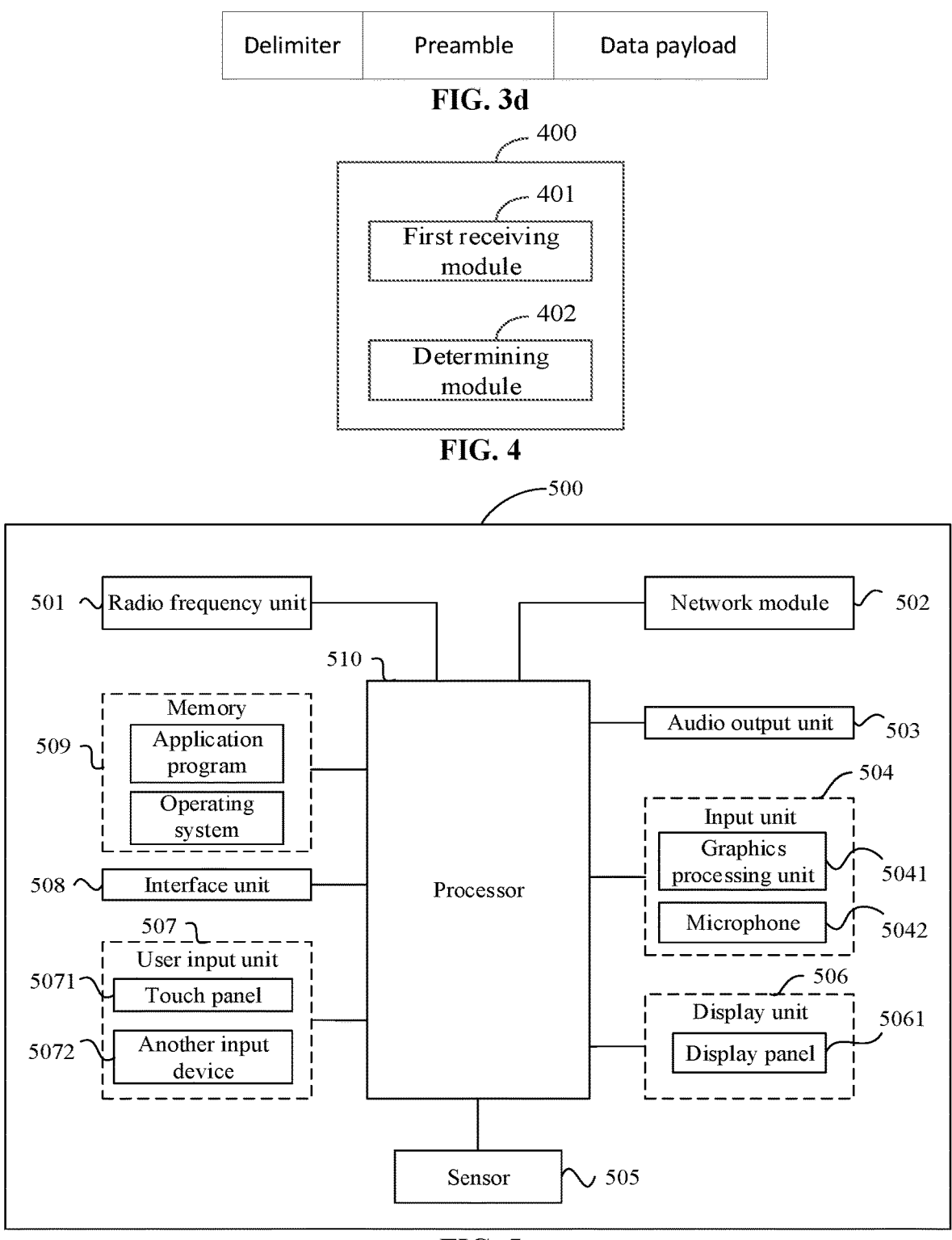

To further reduce power consumption of the low power wake-up receiver, the wake-up signal may alternatively be in a form shown in FIG. 3d. A segment symbol is sent before the dedicated preamble sequence. Before the segment symbol is correctly obtained through detection, the low power wake-up receiver is only in a mode in which energy consumption is very low, and matching detection of the preamble sequence is performed only after the segment symbol is obtained through detection. Compared with continuous sequence detection, this manner can further reduce power consumption.

In the foregoing embodiment, an OOK modulation manner may be used for the preamble sequence and the data payload. Therefore, to facilitate time accumulation at a receive end, a value of an integer multiple of a length of an OOK symbol may be used for a period TDRX.

In this embodiment, an alternative method is as follows: The transmit end does not periodically send a common preamble sequence, the transmit end sends a common preamble sequence in a DRX circle in which the receive end does not send a wake-up signal, and the receive end only wakes up based on a DRX circle to receive a wake-up signal and perform sequence detection. The receive end does not detect the common preamble sequence based on $T_{preamble}$.

A specific method is as follows: The receive end determines, based on a dedicated preamble sequence or a common preamble sequence obtained through detection in an $(n-1)^{th}$ DRX circle, a start position of the sequence, and marks the start position as $t'_{n-1}$. In this case, the receive end uses $t'_{n-1}$ as a new reference time position. Using $t'_{n-1}$ plus one $T_{DRX}$ time shift, and minus one delta obtains a start position of a time window for receiving a wake-up signal in an $n^{th}$ DRX circle, that is, $t'_{n-1}+T_{DRX}-$delta, where $T_{DRX}$ is a length of a DRX circle, and delta is used to further reduce an error impact caused by clock shift of the low power wake-up receiver module. delta may be determined, by using a network configuration or by the receive end, based on an implementation, and a value of delta is greater than or equal to 0.

Refer to FIG. 4. An embodiment of this application provides a discontinuous reception apparatus 400, and the apparatus 400 includes:

a first receiving module 401, configured for a terminal to periodically receive a preamble sequence from a transmit end; and a determining module 402, configured for the terminal to determine, based on a time position of the preamble sequence, a start position of a time window for receiving a wake-up signal in a next DRX circle.

In a possible implementation, the apparatus further includes:

a second receiving module, configured for the terminal to receive a first configuration from the transmit end, where the first configuration includes one or more of the following:

a period for receiving a wake-up signal;

an offset of a start position for receiving a wake-up signal;

an offset in a DRX circle for receiving a wake-up signal; and a size of a time window for receiving a wake-up signal.

In a possible implementation, the preamble sequence is a dedicated preamble sequence used for detection by one or one group of terminals, or the preamble sequence is a common preamble sequence used for detection by a plurality of or a plurality of groups of terminals.

In a possible implementation, the determining module is further configured to:

in a case that the preamble sequence is the dedicated preamble sequence, for the terminal to determine, based on a time position of the dedicated preamble sequence detected in a current DRX circle, the start position of a time window for receiving a wake-up signal in a next DRX circle.

In a possible implementation, in a case that the preamble sequence is a common preamble sequence, the first configuration further includes one or more of the following:

a period of receiving a common preamble sequence; and an offset of a start position for receiving a common preamble sequence.

The determining module is further configured to:

in a case that the preamble sequence is the common preamble sequence, the terminal to determine, based on a latest time position of the dedicated preamble sequence detected the common preamble sequence, the start position of a time window for receiving a wake-up signal in a next DRX circle.

In a possible implementation, the determining module is further configured to:

in a case that the terminal obtains, through detection, the dedicated preamble sequence is detected between two common preamble sequences, for the terminal to update, based on a time position of the dedicated preamble sequence, the start position of a time window for receiving a wake-up signal in a next DRX circle.

FIG. 5 is a schematic diagram of a hardware structure of a terminal according to an embodiment of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art may understand that the terminal 500 may further include a power supply (for example, a battery) that supplies power to each component, and the power supply may be logically connected to the processor 510 by using a power management system, so as to implement functions such as management charging, discharging, and power consumption management by using the power management system. The terminal structure shown in FIG. 5 constitutes no limitation on the terminal, and the terminal may include more or fewer components than those shown in the figure, or combine some components, or have different component arrangements. Details are not described herein.

It should be understood that, in this embodiment of this application, the input unit 504 may include a Graphics Processing Unit (GPU) 5041 and a microphone 5042. The Graphics Processing Unit 5041 processes image data of a still picture or video obtained by an image capture apparatus (such as a camera) in a video capture mode or an image capture mode. The display unit 506 may include a display panel 5061, and the display panel 5061 may be configured in a form of a liquid crystal display, an organic light emitting diode, or the like. The user input unit 507 includes a touch panel 5061 and another input device 5072. The touch panel 5061 is also referred to as a touchscreen. The touch panel 5061 may include a touch detection apparatus and a touch controller. The another input device 5072 may include but is not limited to a physical keyboard, a function key (such as a volume control key or a switch key), a trackball, a mouse, and an operation lever. Details are not described herein again.

In this embodiment of this application, after receiving the downlink data from the network-side device, the radio frequency unit 501 processes the downlink data for the processor 510. In addition, uplink data is sent to the network-side device. Generally, the radio frequency unit 501 includes but is not limited to an antenna, at least one amplifier, a transceiver, a coupler, a low-noise amplifier, a duplexer, and the like.

The memory 509 may be configured to store a software program or instruction and various types of data. The memory 509 may mainly include a storage program or instruction area and a storage data area, where the storage program or instruction area may store an operating system, an application program or an instruction (such as a sound play function or an image play function) required by at least one function, and the like. In addition, the memory 509 may include a high-speed random access memory, and may further include a non-volatile memory. The non-volatile memory may be a Read-Only Memory (ROM), a Programmable ROM (PROM), an erasable programmable Erasable PROM (EPROM), an Electrically EPROM (EEPROM), or a flash memory. For example, at least one magnetic disk storage device, a flash memory device, or another non-volatile solid-state storage device.

The processor 510 may include one or more processing units. Optionally, the processor 510 may be integrated with an application processor and a modem processor, where the application processor mainly processes an operating system, a user interface, an application program, or an instruction, and the modem processor mainly processes wireless communication, such as a baseband processor. It may be understood that the foregoing modem processor may not be integrated into the processor 510.

The processor 510 is configured for the following steps:

A terminal periodically receives a preamble sequence from a transmit end; and the terminal determines, based on a time position of the preamble sequence, a start position of a time window for receiving a wake-up signal in a next DRX circle.

Optionally, the processor 510 is further configured for the following step:

the terminal receives a first configuration from the transmit end, where the first configuration includes one or more of the following:

a period for receiving a wake-up signal;

an offset of a start position for receiving a wake-up signal;

an offset in a DRX circle for receiving a wake-up signal; and a size of a time window for receiving a wake-up signal.

Optionally, the preamble sequence is a dedicated preamble sequence used for detection by one or one group of terminals, or the preamble sequence is a common preamble sequence used for detection by a plurality of or a plurality of groups of terminals.

Optionally, the processor 510 is further configured for the following step:

in a case that the preamble sequence is the dedicated preamble sequence, the terminal determines, based on a time position of the dedicated preamble sequence detected in a current DRX circle, the start position of a time window for receiving a wake-up signal in a next DRX circle.

Optionally, in a case that the preamble sequence is a public preamble sequence, the first configuration further includes one or more of the following step:

a period of receiving a common preamble sequence; and an offset of a start position for receiving a common preamble sequence.

The processor 510 is further configured for the following step:

in a case that the preamble sequence is the common preamble sequence, the terminal determines, based on a latest time position of the dedicated preamble sequence detected the common preamble sequence, the start position of a time window for receiving a wake-up signal in a next DRX circle.

Optionally, the processor 510 is further configured for the following step:

in a case that the terminal obtains, through detection, the dedicated preamble sequence is detected between two common preamble sequences, the terminal updates, based on a time position of the dedicated preamble sequence, the start position of a time window for receiving a wake-up signal in a next DRX circle.

An embodiment of this application further provides a program product, where the program product is stored in a non-volatile storage medium, and the program product is executed by at least one processor to implement steps in the method described in FIG. 2a.

An embodiment of this application further provides a non-transitory readable storage medium. The non-transitory readable storage medium stores a program or an instruction. When the program or the instruction is executed by a processor, processes in the method embodiment shown in FIG. 2a are implemented, and same technical effect can be achieved. To avoid repetition, details are not described herein again.

The processor is a processor in the terminal in the foregoing embodiment. The non-transitory readable storage medium includes a non-transitory computer readable storage medium, such as a Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a network-side device program or instruction to implement processes of the foregoing method embodiment shown in FIG. 2a, and same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a communication device. The communication device is configured to execute the processes of the method embodiment shown in FIG. 2a, and can achieve a same technical effect. To avoid repetition, details are not described herein again.

It should be noted that in this specification, the term "include", "include", or any other variant of the term "include" is intended to cover non-exclusive inclusion, so that a process, method, article, or apparatus that includes a series of elements includes not only those elements but also other elements that are not explicitly listed, or includes elements inherent to such a process, method, article, or apparatus. In absence of more restrictions, the statement "includes a . . . " does not preclude the existence of other identical elements in a process, method, article, or apparatus that includes the element. In addition, it should be noted that the scope of the method and apparatus in the embodiments of this application is not limited to performing a function in a sequence shown or discussed, and may further include performing a function in a basically simultaneous manner or in a reverse sequence according to a function involved. For example, the described method may be performed in a different order, and various steps may be added, omitted, or combined. In addition, features described with reference to some examples may be combined in other examples.

According to the foregoing descriptions of the implementations, persons skilled in the art may clearly understand that the foregoing method embodiments may be implemented by using software plus a required universal hardware platform, or certainly may be implemented by using hardware. However, in many cases, the former is a better implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The foregoing describes embodiments of this application with reference to the accompanying drawings. However, this application is not limited to these specific embodiments. The specific embodiments are merely illustrative rather than restrictive. Inspired by this application, persons of ordinary skill in the art may develop many other manners without departing from the principle of this application and the protection scope of the claims, and all such manners fall within the protection scope of this application.

The invention claimed is:

1. A discontinuous reception method, comprising:

periodically receiving, by a terminal, a preamble sequence from a transmit end; and determining, by the terminal based on a time position of the preamble sequence, a start position of a time window for receiving a wake-up signal in a next discontinuous reception (DRX) circle.

2. The method according to claim 1, wherein the method further comprises:

receiving, by the terminal, a first configuration from the transmit end, wherein the first configuration comprises one or more of the following:

a period for receiving a wake-up signal;

an offset of a start position for receiving a wake-up signal;

an offset in a DRX circle for receiving a wake-up signal; or, a size of a time window for receiving a wake-up signal.

3. The method according to claim 1, wherein the preamble sequence is a dedicated preamble sequence used for detection by one or one group of terminals, or the preamble sequence is a common preamble sequence used for detection by a plurality of or a plurality of groups of terminals.

4. The method according to claim 3, wherein the determining, by the terminal based on a time position of the preamble sequence, a start position of a time window for receiving a wake-up signal in a next discontinuous reception (DRX) circle comprises:

in a case that the preamble sequence is the dedicated preamble sequence, determining, by the terminal, based on a time position of the dedicated preamble sequence detected in a current DRX circle, the start position of a time window for receiving a wake-up signal in a next DRX circle.

5. The method according to claim 3, wherein in a case that the preamble sequence is the common preamble sequence, the first configuration further comprises one or more of the following:

a period of receiving a common preamble sequence; or, an offset of a start position for receiving a common preamble sequence;

and the determining, by the terminal based on a time position of the preamble sequence, a start position of a time window for receiving a wake-up signal in a next discontinuous reception (DRX) circle comprises:

in a case that the preamble sequence is the common preamble sequence, determining, by the terminal, based on a time position of the latest detected common preamble sequence, the start position of a time window for receiving a wake-up signal in a next DRX circle.

6. The method according to claim 5, wherein the determining, by the terminal based on a time position of the preamble sequence, a start position of a time window for receiving a wake-up signal in a next discontinuous reception (DRX) circle further comprises:

in a case that the dedicated preamble sequence is detected between two common preamble sequences, updating, by the terminal, based on a time position of the dedicated preamble sequence, the start position of a time window for receiving a wake-up signal in a next DRX circle.

7. A terminal, comprising: a processor, a memory, and a program that is stored in the memory and capable of running on the processor, wherein the program, when executed by the processor, causes the terminal to perform:

periodically receiving a preamble sequence from a transmit end; and determining based on a time position of the preamble sequence, a start position of a time window for receiving a wake-up signal in a next discontinuous reception (DRX) circle.

8. The terminal according to claim 7, wherein the program, when executed by the processor, causes the terminal to further perform:

receiving a first configuration from the transmit end, wherein the first configuration comprises one or more of the following:

a period for receiving a wake-up signal;

an offset of a start position for receiving a wake-up signal;

an offset in a DRX circle for receiving a wake-up signal; or, a size of a time window for receiving a wake-up signal.

9. The terminal according to claim 7, wherein the preamble sequence is a dedicated preamble sequence used for detection by one or one group of terminals, or the preamble sequence is a common preamble sequence used for detection by a plurality of or a plurality of groups of terminals.

10. The terminal according to claim 9, wherein when determining based on a time position of the preamble sequence, a start position of a time window for receiving a wake-up signal in a next discontinuous reception (DRX) circle, the program, when executed by the processor, causes the terminal to further perform:

in a case that the preamble sequence is the dedicated preamble sequence, determining based on a time position of the dedicated preamble sequence detected in a current DRX circle, the start position of a time window for receiving a wake-up signal in a next DRX circle.

11. The terminal according to claim 9, wherein in a case that the preamble sequence is the common preamble sequence, the first configuration further comprises one or more of the following:

a period of receiving a common preamble sequence; or, an offset of a start position for receiving a common preamble sequence;

and when determining based on a time position of the preamble sequence, a start position of a time window for receiving a wake-up signal in a next discontinuous reception (DRX) circle, the program, when executed by the processor, causes the terminal to further perform:

in a case that the preamble sequence is the common preamble sequence, determining based on a time position of the latest detected common preamble sequence, the start position of a time window for receiving a wake-up signal in a next DRX circle.

12. The terminal according to claim 11, wherein when determining based on a time position of the preamble sequence, a start position of a time window for receiving a wake-up signal in a next discontinuous reception (DRX) circle, the program, when executed by the processor, causes the terminal to further perform:

in a case that the dedicated preamble sequence is detected between two common preamble sequences, updating based on a time position of the dedicated preamble sequence, the start position of a time window for receiving a wake-up signal in a next DRX circle.

13. A non-transitory readable storage medium, wherein a program or an instruction is stored on the non-transitory readable storage medium, wherein the program or instruction, when executed by a processor, causes the processor to perform:

periodically receiving a preamble sequence from a transmit end; and determining based on a time position of the preamble sequence, a start position of a time window for receiving a wake-up signal in a next discontinuous reception (DRX) circle.

14. The non-transitory readable storage medium according to claim 13, wherein the program or instruction, when executed by the processor, causes the processor to further perform:

receiving a first configuration from the transmit end, wherein the first configuration comprises one or more of the following:

a period for receiving a wake-up signal;

an offset of a start position for receiving a wake-up signal;

an offset in a DRX circle for receiving a wake-up signal; or, a size of a time window for receiving a wake-up signal.

15. The non-transitory readable storage medium according to claim 13, wherein the preamble sequence is a dedicated preamble sequence used for detection by one or one group of terminals, or the preamble sequence is a common preamble sequence used for detection by a plurality of or a plurality of groups of terminals.

16. The non-transitory readable storage medium according to claim 15, wherein when determining based on a time position of the preamble sequence, a start position of a time window for receiving a wake-up signal in a next discontinuous reception (DRX) circle, the program or instruction, when executed by the processor, causes the processor to further perform:

in a case that the preamble sequence is the dedicated preamble sequence, determining based on a time position of the dedicated preamble sequence detected in a current DRX circle, the start position of a time window for receiving a wake-up signal in a next DRX circle.

17. The non-transitory readable storage medium according to claim 15, wherein in a case that the preamble sequence is the common preamble sequence, the first configuration further comprises one or more of the following:

a period of receiving a common preamble sequence; or, an offset of a start position for receiving a common preamble sequence;

and when determining based on a time position of the preamble sequence, a start position of a time window for receiving a wake-up signal in a next discontinuous reception (DRX) circle, the program or instruction, when executed by the processor, causes the processor to further perform:

in a case that the preamble sequence is the common preamble sequence, determining based on a time position of the latest detected common preamble sequence, the start position of a time window for receiving a wake-up signal in a next DRX circle.

18. The non-transitory readable storage medium according to claim 17, wherein when determining based on a time position of the preamble sequence, a start position of a time window for receiving a wake-up signal in a next discontinuous reception (DRX) circle, the program or instruction, when executed by the processor, causes the processor to further perform:

in a case that the dedicated preamble sequence is detected between two common preamble sequences, updating based on a time position of the dedicated preamble sequence, the start position of a time window for receiving a wake-up signal in a next DRX circle.

19. A chip, comprising a processor and a communication interface, wherein the communication interface is coupled to the processor, and the processor is configured to run a program or an instruction to implement steps in the method according to claim 1.

20. A computer program product, wherein the computer program product is stored in a non-volatile storage medium, and the computer program product is executed by at least one processor to implement steps in the method according to claim 1.

* * * * *